June 30, 1931.  A. NYMAN  1,811,861
ILLUMINATING APPARATUS
Filed Oct. 20, 1926   3 Sheets-Sheet 1
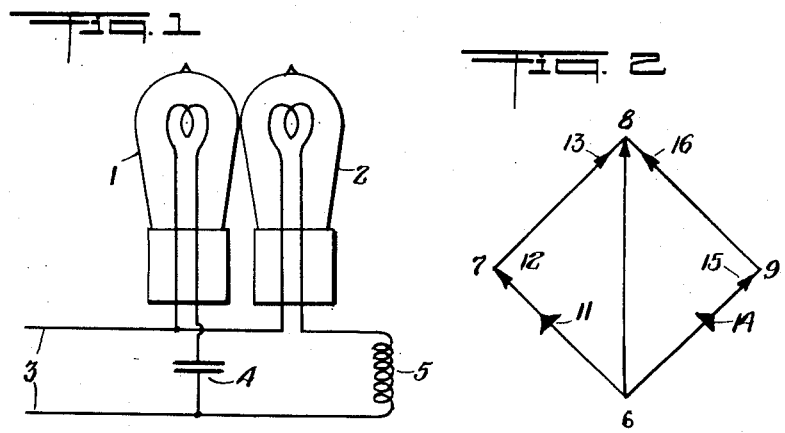
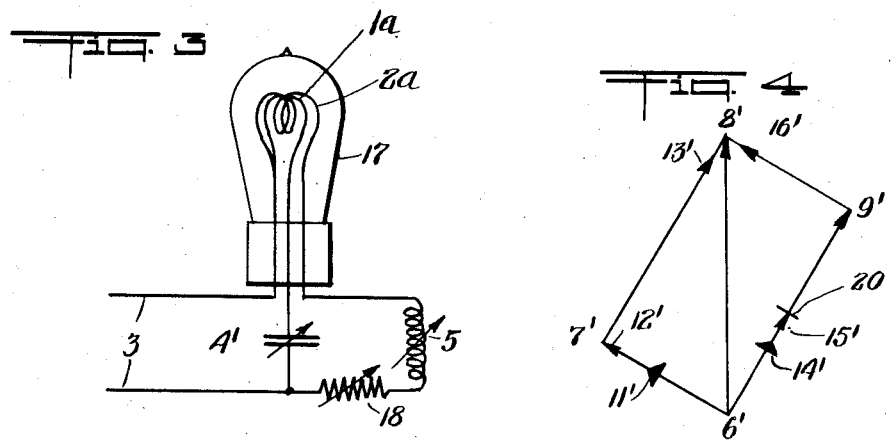
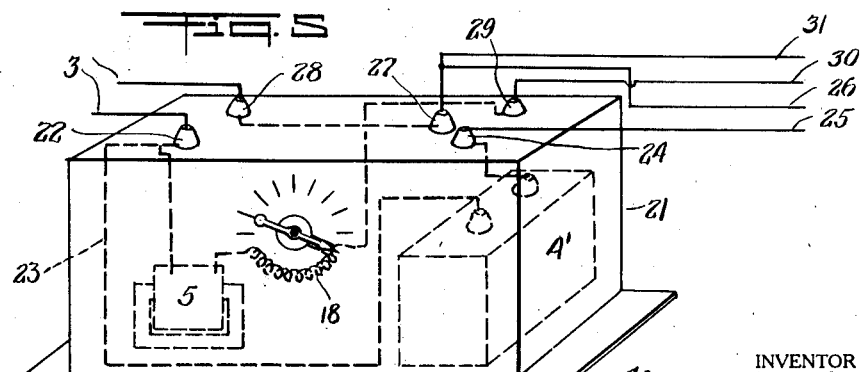
INVENTOR
Alexander Nyman
BY
William F. Nickel
ATTORNEY

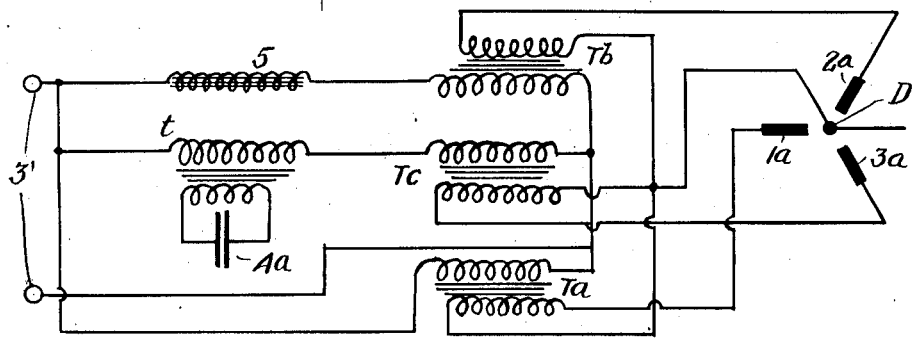
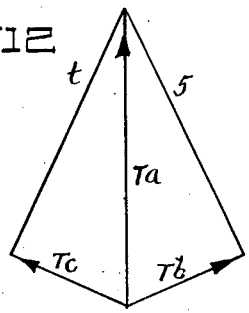
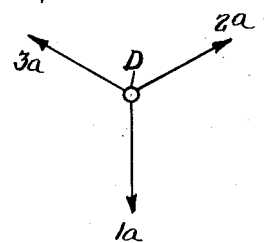
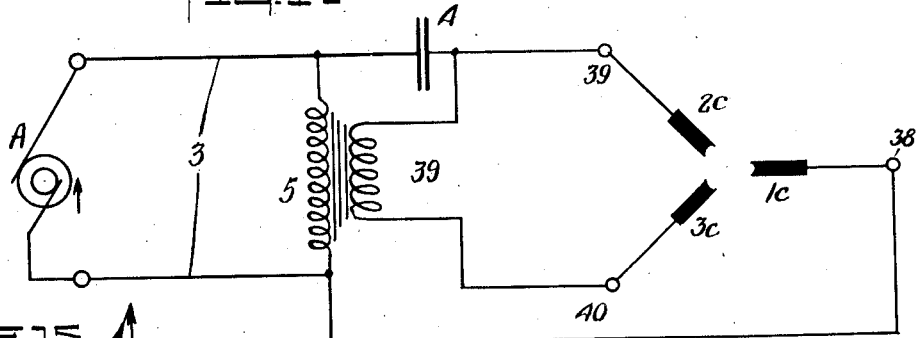
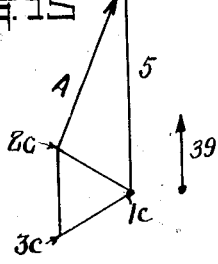
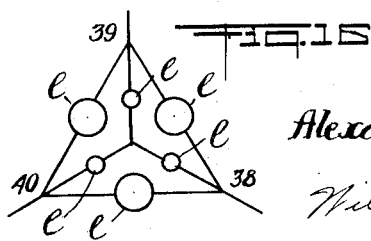

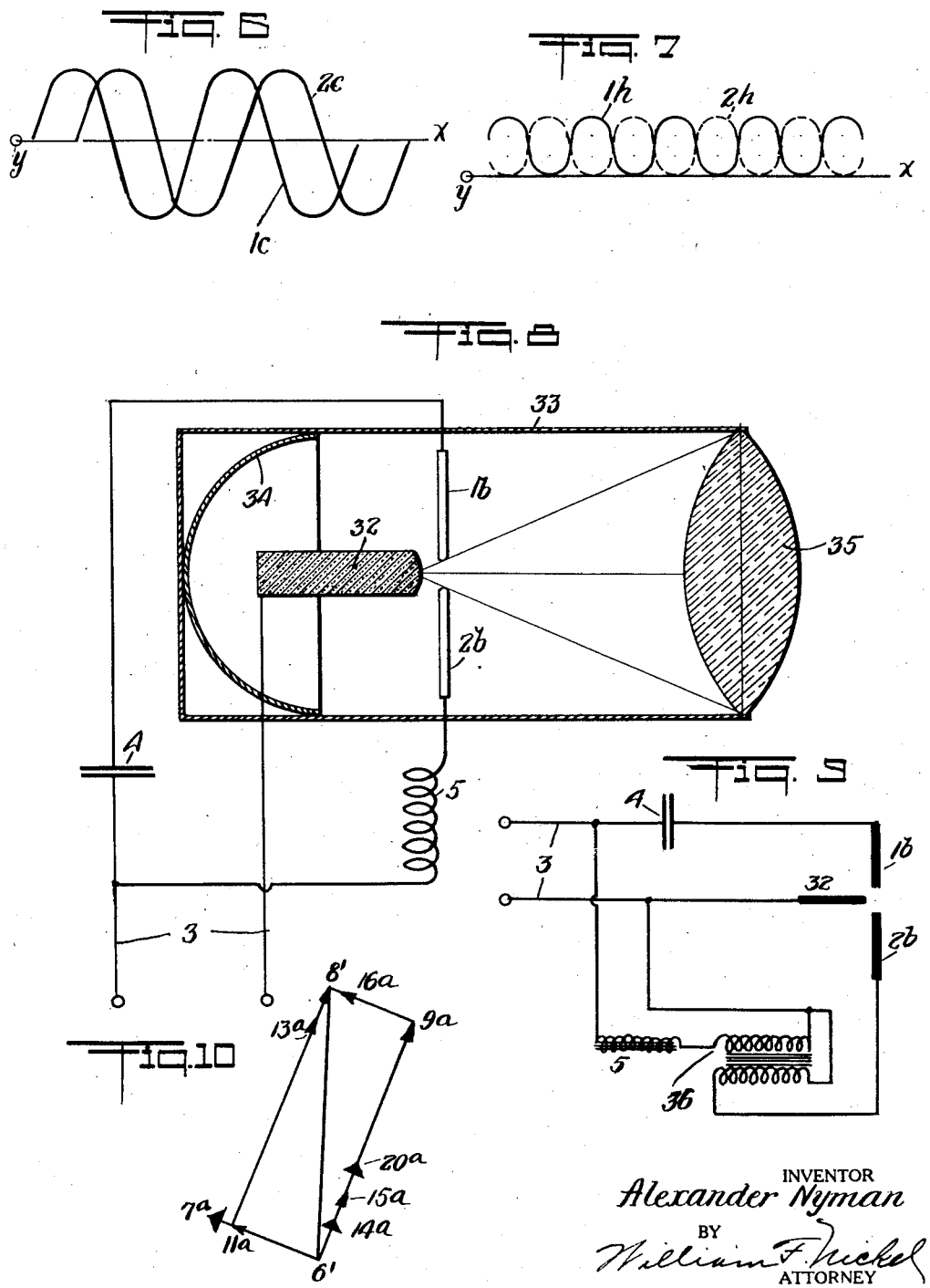

Patented June 30, 1931

1,811,861

UNITED STATES PATENT OFFICE

ALEXANDER NYMAN, OF DOBBS FERRY, NEW YORK, ASSIGNOR TO RADIO PATENTS CORPORATION, OF NEW YORK, N. Y., A CORPORATION OF NEW YORK

ILLUMINATING APPARATUS

Application filed October 20, 1926. Serial No. 143,008.

This invention relates to improvements in illuminating apparatus; especially electric illuminating apparatus.

The object of the invention is to provide electrical illuminating apparatus capable of affording illumination of constant intensity by means of alternating current.

A further object of the invention is to provide electrical illumination apparatus which is capable of affording illumination of constant intensity when operating upon alternating current, through the agency of electrical condensers and other appliances connected in suitable relation, together with an improved method by which the desired result can be very advantageously secured.

Further objects of the invention will appear from the following description taken with drawings, and the novel characteristics of the invention will be defined in the appended claims. But this disclosure is by way of example only, and I may resort to variations not actually shown or described herein but fully embraced in the principle by which the invention is controlled.

On the drawings:

Figure 1 is a view showing the connections for one mode of practicing my invention;

Figure 2 is a vector diagram showing the electrical reactions which take place in the operation of parts shown in Figure 1;

Figures 3 and 4 are views similar to views 1 and 2 respectively showing another apparatus and mode of practicing my invention;

Figure 5 shows a casing containing electrical appliances and means for making connections as required in the practice of my invention;

Figures 6 and 7 are explanatory diagrams illustrating the action which takes place in the use of the circuits shown in Figures 1, 2 and 5;

Figure 8 shows how the principle of my invention can be utilized with an arc lamp to produce illumination of constant intensity on alternating current;

Figure 9 is a view of another circuit for producing constant illumination with an arc lamp;

Figure 10 is a diagram of the electrical reactions;

Figure 11 is a view of a circuit containing another method of producing constant illumination with an arc lamp;

Figures 12 and 13 show the electrical reactions of the circuit of Figure 10;

Figure 14 is a view of an additional circuit for producing a constant illumination with an arc lamp; and Figures 15 and 16 are diagrams showing the electrical reactions of the circuit of Figure 14.

The same numerals identify the same parts throughout.

Referring first to Figures 1 and 2, I employ the numeral 1 to indicate an incandescent lamp and the numeral 2 to indicate a similar lamp. These lamps are both connected to be supplied with alternating current from a pair of conductors 3. With the lamps 1 and 2 in parallel across the supply leads 3, the operation of the lamps upon alternating current in the usual way would entail a periodic loss of intensity of illumination owing to the fact that the current periodically passes through zero in rising to a positive maximum and through zero again in passing to its negative maximum. If the frequency is low enough the lamps can be noticed to flicker, but even with frequency too high for the observer to notice flickering, the intensity of illumination necessarily fluctuates synchronously with the alternations of current through the lamps.

In different arts and in different kinds of work, particularly in moving pictures such fluctuations in the intensity of the illumination cannot be permitted. Usually the alternating current is converted into direct current and the direct current is caused to flow through the lamps so that the intensity of the illumination becomes constant.

With my invention, I can utilize alternating current in the operation of the lamps 1 and 2 by causing the voltage and current through the filament of the lamp 1, for example to lead the voltage and current through the lamp 2 by 90°. Then, as the current and voltage through the filament of one lamp is at zero, the current and voltage through the filament of the other lamp are at the maximum. To produce this effect, I insert a condenser 4 in series with the filament of a lamp 1 and an inductance 5 in series with the filament of the lamp 2. Hence, if in Figure 2 the line 6—8 represents the line voltage, the arrow 9—16 will represent the voltage of the inductance 5 while the arrows 6—14 and 6—9 respectively represent the current and voltage through the filament of the lamp 2. The current and voltage of the lamp will thus be retarded 90° with respect to the voltage 9—16 of the inductance 5, and 45° with respect to the voltage across the leads 3. As for the other lamp, the arrow 7—13 will represent the voltage of the condenser 4 while the arrows 6—11 and 6—12 will represent respectively the current and voltage through the filament of the lamp 1. This current and voltage will, of course lead the condenser voltage 7—13 and be advanced 45° with respect to the line voltage 6—8. Thus the current and voltage of the filament of the lamp 1 will lead by 90° the current and voltage of the lamp 2. This condition is shown in Figure 6 where 1c represents the alternating current through the filament of the lamp 1, and 2c represents the current through the filament of the lamp 2, the latter being 90° retarded with respect to the former. In this view the line OX represents the zero line and OY represents the axis at 90° thereto. Hence, the heating effect on the filament of the lamp 1 is indicated at 1h and the heating effect on the filament of the lamp 2 will be indicated by the curve 2h in Figure 7, the peaks of the curve 1h alternating with the peak of the curve 2h and the resultant sum of these two curves will be a straight line parallel to OX, and having all points at a constant height above the line OX as measured along the line OY. Thus, constant illumination will be afforded by the lamps 1 and 2.

Figures 3 and 4 show a similar method in which instead of two lamps, a single lamp 17 is utilized with two filaments in parallel across the mains 3. One of these filaments 1a has an adjustable condenser 4' in series with it and the other filament 2a is in series with an adjustable inductance 5 and a variable resistance 18, which are also in series with each other. With this combination of parts, the lamp 17 will give the same constant illumination as the lamps 1 and 2. On the vector diagram of Figure 4 the arrows 6'—8' will represent the line voltage across the leads 3 as before. The arrows 6'—11' and 6' to 7' indicate respectively the current and voltage through the filament 1a which lead the line voltage by 60°, and the arrow 7'—13' indicates the voltage of the condenser 4'. Further, the arrows 6'—14' and 6'—15' indicate the voltage and current through the filament 2a and the arrow 9'—16' indicates the voltage of the inductance 5. The arrow 20—9' indicates the drop due to the resistance 18 so that the voltages 6'—7' and 6'—15' are equal and so are the currents through the two filaments. While the current and voltage through the filament 2a is retarded only 30° with respect to the line voltage, the current through the two filaments 1a and 2a are thus out of phase 90° as before, because the current through the filament 1a is advanced 60°. The result is again as indicated in Figures 6 and 7 with respect to the lamps 1 and 2 and constant illumination is again secured. It will be also seen that the voltage on the filament will be one-half the line voltage.

Figure 5 shows a casing 21 for the condenser 4', the inductance 5 and the adjustable resistance 18. One of the leads 3 runs to a contact 22 united by a conductor 23 to one terminal of the condenser 4'; the other terminal of the condenser being connected to a terminal 24 outside of the casing, from which extends a lead 25 to one filament such as the filament 1a of the lamp 17, Figure 3; the other extremity of this filament being connected by a wire 26 to a terminal 27 joined to a terminal 28 to which the other lead 3 is attached. The inductance 5 is also connected to the terminal 22 and through the adjustable resistance 18 to another terminal 29 on the casing 21 from which extends a lead 30 to the other filament 2a for example of the lamp 17, the opposite extremity or the terminal of this filament being joined by the wire 31 to terminal 27 and thus connected to the opposite lead 3.

With this construction, the invention can be practiced as before with a single lamp such as the lamp 17, having two filaments; or two lamps, each having a separate filament. It is only necessary that the lamp having two filaments has three contacts so that proper connections in any suitable way can be made with the conductors 25 and 26 and 30 and 31. If the values of resistance, capacity and inductance are chosen as in Figure 4, then 2—110 volt lamps may be used on a 220 volt circuit.

Figure 8 shows how the principle of the invention can be utilized with an arc lamp. Such a lamp will have two electrodes 1b and 2b properly arranged with regard to a third electrode 32 and the three electrodes can be in a case 33 containing a reflector 34 and carrying a lens 35 in front of the lamp. The operation of this device will be the same as set forth above in connection with Figure 1, because the current through the electrode or illuminating member 1b is advanced 45° and the current through the electrode or illuminating member 2b will be retarded 45°, thus putting the two currents 90° out of phase giving the same constant illumination as in the case of the illuminating members or filaments of the lamps 1 and 2 in Figure 1 and the illuminating members 1a and 2a of the lamps 17 in Figure 3.

In Figure 9 I show the same circuit as in Figure 8 except that a step-down transformer is used, the secondary of which is connected to the electrode 2b. The condenser 4 is in line with one of the leads 3 and is connected to the electrode 1b, the other lead 3 being connected directly to the electrode 32 and across the leads 3 is inductance 5 in series with the primary of a transformer 36, the secondary of which, as stated, is connected to the electrode 2b at one extremity, and to the end of the primary at the other. Figure 10 shows the electrical conditions in this circuit. The line 6′—8′ represents the line voltage; the line 6′—11a is the voltage between the electrode 1b and 32; the line 6′—7a is the current in the condenser C, while the line 11a—13a is the voltage in the condenser C. The line 9a—16a is the voltage of the inductance 5; the line 6′—9a the voltage of the primary of the transformer 36. The line 6—14a represents the current in the primary of the transformer 36. The line 6′—15a represents the voltage in the secondary of this transformer and between the electrodes 2b and 32. The line 6′—20a represents the current in the secondary of the transformer. Thus the current from electrode 1b to 32 is 90° out of phase from the current 2b to electrode 32, and constant illumination again results. Also a voltage may be secured which will give the best operation of the arc.

Figure 11 shows a circuit supplied by alternating current connected to the leads attached to the terminals 3′, this circuit comprising the primaries of three transformers Ta, Tb and Tc in parallel with each other. In circuit with the primary of the transformer Tb is an inductance 5, and in circuit with the inductance Tc is a transformer t, the secondary of which is short-circuited by a condenser 4a. The secondaries of the three transformers Ta, Tb and Tc each have one terminal joined to an electrode 1a, 2a and 3a, and their opposite extremities joined to a single lead which is connected to a central electrode D. Thus three-phase current makes an arc light and this arc light may lie between the electrodes 1a, 2a and 3a and the central electrode D, or the central electrode D might be replaced by three electrodes and three independent arcs might be employed.

Figure 12 is a diagram of voltages in the primaries of the three transformers Ta, Tb and Tc, indicated by arrows correspondingly marked. The numerals 5 indicate the voltage of the inductance coil 5, and the numeral t indicates the voltage of the primary of the transformer t. Figure 13 indicates the voltage from the electrodes 1a, 2a and 3a to the middle electrode 3. The voltages of the three transformers Ta, Tb and Tc are out of phase with each other, and the voltages of the electrodes 1a, 2a and 3a are 120° apart.

Figure 14 shows a modified three-phase arrangement wherein an alternator A supplies alternating current to leads 3, one of which is connected to an electrode 1c, and the other through a condenser 4 to an electrode 2c. Across the leads 3 is connected a transformer 5 which energizes the secondary 39′ connected to another electrode 3c, and to the lead between the condenser 4 and electrode 2c. Figure 15 gives the voltage vector diagram where the arrow 4 indicates the condenser voltage, the arrow 5, the transformer primary voltage, while the arrows between the points 1c, 2c and 3c indicate the voltages between the three electrodes in question. These voltages are in a three-phase delta relation. As shown in Figure 14, the three electrodes 1c, 2c and 3c each have terminals 38, 39 and 40 respectively to unite them to the leads 3, the condenser 4 and secondary 39′. The arrow 39′ in Figure 15 indicates the voltage of the secondary 39′.

As shown in Figure 16, I can use six lamps instead of three electrodes, there being three outer lamps joined across the terminals 38, 39 and 40, and three inner lamps in the same positions as electrodes 1c, 2c and 3c also joined to the terminals 38, 39 and 40, and to a common terminal at the center. This arrangement also gives constant illumination.

My invention thus affords constant illumination with alternating current and no transformation of alternating current into direct current is necessary.

Having described my invention, what I believe to be new and desire to secure and protect by Letters Patent of the United States is:—

1. A system for producing constant illumination comprising a single phase alternating current supply line, a transformer, a condenser, and a reverse connection of the secondary winding of said transformer in series with said condenser, respectively, connected to the single phase supply line for producing currents in three phase relation, an illuminating unit having a plurality of lighting elements, and means for connecting said currents to the lighting elements.

2. A system for producing constant illumination from single phase alternating current, comprising a lighting unit having at least three electrodes in operative relation to each other, a single phase alternating current supply line, two of the said electrodes being inductively coupled to the supply line by a transformer, two of the said electrodes being connected across the supply line through a condenser, and two of the said electrodes being connected across the supply line through the secondary winding of said transformer in series with said condenser, whereby currents in three phase relation are supplied to the lighting unit.

In testimony whereof I affix my signature.

ALEXANDER NYMAN.